United States Patent
Garcia-Herreros et al.

(10) Patent No.: US 11,637,470 B2
(45) Date of Patent: Apr. 25, 2023

(54) ELASTIC-LOCKING WINDING CARRIER FOR PREFORMED COIL ASSEMBLIES OF AN ELECTRIC MOTOR

(71) Applicant: ETEL S.A., Môtiers (CH)

(72) Inventors: Iván Garcia-Herreros, St-Sulpice (CH); Johann Pourchet, La Chaux de Gilley (FR)

(73) Assignee: ETEL S.A., Môtiers (CH)

( * ) Notice: Subject to any disclaimer, the term of this patent is extended or adjusted under 35 U.S.C. 154(b) by 347 days.

(21) Appl. No.: 17/154,207

(22) Filed: Jan. 21, 2021

(65) Prior Publication Data

US 2021/0234425 A1 Jul. 29, 2021

(30) Foreign Application Priority Data

Jan. 23, 2020 (EP) ..................................... 20153313

(51) Int. Cl.
*H02K 3/52* (2006.01)
*H02K 1/14* (2006.01)

(52) U.S. Cl.
CPC ............. *H02K 3/522* (2013.01); *H02K 1/148* (2013.01)

(58) Field of Classification Search
CPC ............... H02K 15/0012; H02K 15/10; H02K 2213/12; H02K 3/30; H02K 3/32; H02K 3/34; H02K 3/345; H02K 3/522; H02K 1/148; H02K 1/185; H02K 1/278; H02K 21/16
USPC .................................... 310/194, 43, 214, 215
See application file for complete search history.

(56) References Cited

U.S. PATENT DOCUMENTS

| 3,339,097 | A | * | 8/1967 | Dunn | ..................... | H02K 3/522 |
| | | | | | | 310/194 |
| 5,783,893 | A | * | 7/1998 | Dade | ..................... | H02K 16/00 |
| | | | | | | 310/266 |
| 6,509,665 | B1 | * | 1/2003 | Nishiyama | ............. | H02K 9/223 |
| | | | | | | 310/194 |
| 6,566,779 | B2 | * | 5/2003 | Takano | .................. | H02K 3/522 |
| | | | | | | 310/194 |
| 6,870,292 | B2 | * | 3/2005 | Owada | ..................... | H02K 3/24 |
| | | | | | | 310/194 |

(Continued)

FOREIGN PATENT DOCUMENTS

| DE | 102012020680 A1 | * | 4/2014 | ........... H02K 15/066 |
| DE | 102012020680 A1 | | 4/2014 | |

(Continued)

*Primary Examiner* — Maged M Almawri
(74) *Attorney, Agent, or Firm* — Carter DeLuca & Farrell LLP

(57) ABSTRACT

An elastic-locking winding carrier for a preformed coil assembly of a stator of an electric motor, includes a winding portion adapted to receive a winding having a wound electrical conductor to produce a coil. The winding portion includes upper and lower portions, first and second openings arranged on the winding portion, and first and second flexible members located inside respective first and second openings and extending thereacross. The first and second flexible members are arranged such that either of the first and second flexible members cooperates with a tooth of the stator as a function of the magnitude of the gap between the tooth and the lower portion of the winding portion when the preformed coil assembly is mounted on the tooth to fix the preformed coil assembly to the tooth.

17 Claims, 4 Drawing Sheets

(56) References Cited

U.S. PATENT DOCUMENTS

| | | | |
|---|---|---|---|
| 7,382,075 B2* | 6/2008 | Wang | H02K 3/522 310/260 |
| 8,754,562 B2* | 6/2014 | Platon | H02K 5/132 310/215 |
| 9,124,161 B2* | 9/2015 | Kim | H02K 16/00 |
| 9,444,299 B2 | 9/2016 | Mougin et al. | |
| 2001/0048262 A1 | 12/2001 | Takano et al. | |
| 2003/0098630 A1* | 5/2003 | Owada | H02K 3/24 310/194 |
| 2004/0108781 A1* | 6/2004 | Razzell | H02K 51/00 310/112 |
| 2005/0012413 A1* | 1/2005 | Bott | H02K 3/522 310/71 |
| 2005/0044692 A1* | 3/2005 | Takano | H02K 15/095 29/605 |
| 2007/0222324 A1* | 9/2007 | Fukui | H02K 3/522 310/260 |
| 2007/0279178 A1 | 12/2007 | Zimmer et al. | |
| 2009/0189474 A1* | 7/2009 | van Heyden | H02K 3/522 310/195 |
| 2010/0188181 A1* | 7/2010 | Urano | H02K 3/522 336/198 |
| 2010/0213784 A1* | 8/2010 | Iizuka | H02K 3/325 29/596 |
| 2010/0275436 A1* | 11/2010 | Kiyono | H02K 15/12 29/596 |
| 2011/0316366 A1* | 12/2011 | Abbasian | H02K 19/103 310/46 |
| 2012/0098380 A1* | 4/2012 | Wang | H02K 15/0442 310/260 |
| 2012/0286619 A1* | 11/2012 | Tsuiki | H02K 3/522 310/215 |
| 2013/0020885 A1* | 1/2013 | Hsieh | H02K 5/08 310/43 |
| 2013/0193800 A1* | 8/2013 | Yokogawa | H02K 3/522 310/215 |
| 2014/0217859 A1* | 8/2014 | Saito | H02K 1/276 310/68 D |
| 2019/0319500 A1* | 10/2019 | Shinohara | H02K 3/325 |

FOREIGN PATENT DOCUMENTS

| | | | | |
|---|---|---|---|---|
| EP | 2717434 A1 | | 4/2014 | |
| JP | 2002305851 A | * | 10/2002 | ............ H02K 1/148 |
| JP | 2018-182873 A | | 11/2018 | |
| JP | 6628706 B2 | | 1/2020 | |
| WO | WO-2008153175 A1 | * | 12/2008 | ............ H02K 3/522 |
| WO | WO-2011108098 A1 | * | 9/2011 | ............ H02K 3/325 |
| WO | 2015/043844 A2 | | 4/2015 | |
| WO | WO-2015043844 A2 | * | 4/2015 | ............ H02K 1/146 |

* cited by examiner

ELASTIC-LOCKING WINDING CARRIER FOR PREFORMED COIL ASSEMBLIES OF AN ELECTRIC MOTOR

CROSS-REFERENCE TO RELATED APPLICATIONS

The present application claims priority to Application No. 20153313.0, filed in the European Patent Office on Jan. 23, 2020, which is expressly incorporated herein in its entirety by reference thereto.

FIELD OF THE INVENTION

The present invention relates to an elastic-locking winding carrier for a preformed coil assembly and to a preformed coil assembly that includes elastic-locking winding carriers and is configured to be elastically locked onto a tooth of a stator of an electric motor.

BACKGROUND INFORMATION

Coils are commonly inserted on the stator teeth using spacers, as described, for example, in European Patent Document No. 2 717 434 and U.S. Patent Application Publication No. 2014/0097710, to ensure that they are centered vertically with respect to their corresponding tooth during the assembly process of the electric motor before a potting operation that includes injecting synthetic resin so as to notably fix together all components of the stator, particularly the coils. The use of such spacers is however time consuming and costly.

Other approaches to center the coils with the teeth of the stator are also conventional.

For example, U.S. Patent Application Publication No. 2007/0279178 describes a winding body, for a preformed coil assembly, that includes a winding area formed by a winding support and two sidepieces connected to the winding support. A latching device is provided on the winding support. The latching device includes a rectangular through-opening extending across the winding support and a flexible locking tab projecting from a lateral side of the rectangular through-opening and extending thereacross. The locking tab is free to pivot in the rectangular opening and is configured to engage in a corresponding recess in a stator tooth, where it is then locked in place. A preformed coil assembly that includes such a winding body may therefore be locked in place on a tooth of a stator of an electrical machine, especially in the radial direction.

The above described winding body has the drawback that to safely lock the preformed coil assembly in the radial direction requires the gap between the upper side of a tooth of the stator and the lower portion of the winding support to remain constant or not vary significantly.

SUMMARY

Example embodiments of the present invention provide an elastic-locking winding carrier configured to obviate or at least mitigate the above disadvantages.

Moreover, example embodiments of the present invention provide an elastic-locking winding carrier for a preformed coil assembly that ensures an adequate locking of the preformed coil assembly both in the radial direction and the axial direction of the stator irrespective of the magnitude of the gap, to a certain extent, between the upper side and the lower side of the tooth of the stator and the lower portion of a winding portion of the elastic-locking winding carrier when the preformed coil assembly is pushed radially on the tooth.

According to an example embodiment of the present invention, an elastic-locking winding carrier for a preformed coil assembly of a stator of an electric motor includes a winding portion adapted to receive a winding having a wound electrical conductor for producing a coil. The winding portion includes an upper portion and a lower portion, a first opening and a second opening arranged on the winding portion and a first flexible member and a second flexible member mounted inside respective first and second openings. The first and second flexible members are arranged such that either of the first and second flexible members cooperates with a tooth of the stator as a function of the magnitude of the gap between the tooth and the lower portion of the winding portion when the preformed coil assembly is mounted on the tooth in order to fix the preformed coil assembly to the tooth.

A distal end of both the first and second flexible members may extend below the lower portion of the winding portion into a tooth receiving portion, and the distal end of one of the first and second flexible members may extend further below the other of the first and second flexible members.

One of the first and second flexible members may be configured to break loose when the preformed coil assembly is mounted on the tooth.

The first and second flexible members may each be connected to a lateral side of respective first and second openings and extend thereacross.

The tooth receiving portion may be arranged as a right rectangular prism-shaped portion configured to be adjusted against an upper or lower portion of a tooth of the stator.

The first and second flexible members may be aligned within a plane equidistant from two opposite sides of the winding portion.

The first and second openings may be arranged as through-openings extending from the upper portion to the lower portion of the winding portion.

The first and second openings may be spaced apart from each other to form a bridge therebetween to ensure structural rigidity to the winding carrier.

The first and second openings may have a constant square or rectangular cross-section along an axis perpendicular to a plane coinciding with the upper portion of the winding portion.

According to an example embodiment of the present invention, a preformed coil assembly includes a preformed coil having an elongated opening and two winding carriers arranged on respective ends of the elongated opening of the preformed coil. At least one of the two winding carriers is arranged as an elastic-locking winding carrier as described above.

Each of the two winding carriers may be arranged as an elastic-locking winding carrier as described above.

According to an example embodiment of the present invention, a stator for a rotatory electric motor includes radial teeth and a preformed coil assembly, as described above, mounted on each tooth of the stator. The first and second flexible members of the first and second elastic-locking winding carriers of the preformed coil assembly lockingly cooperate with respective upper and lower sides of a tooth of the stator.

According to an example embodiment of the present invention, a rotary electric motor includes the stator as described above.

Further features and aspects of example embodiments of the present invention are described in more detail below with reference to the appended Figures.

DETAILED DESCRIPTION

Figure 1:
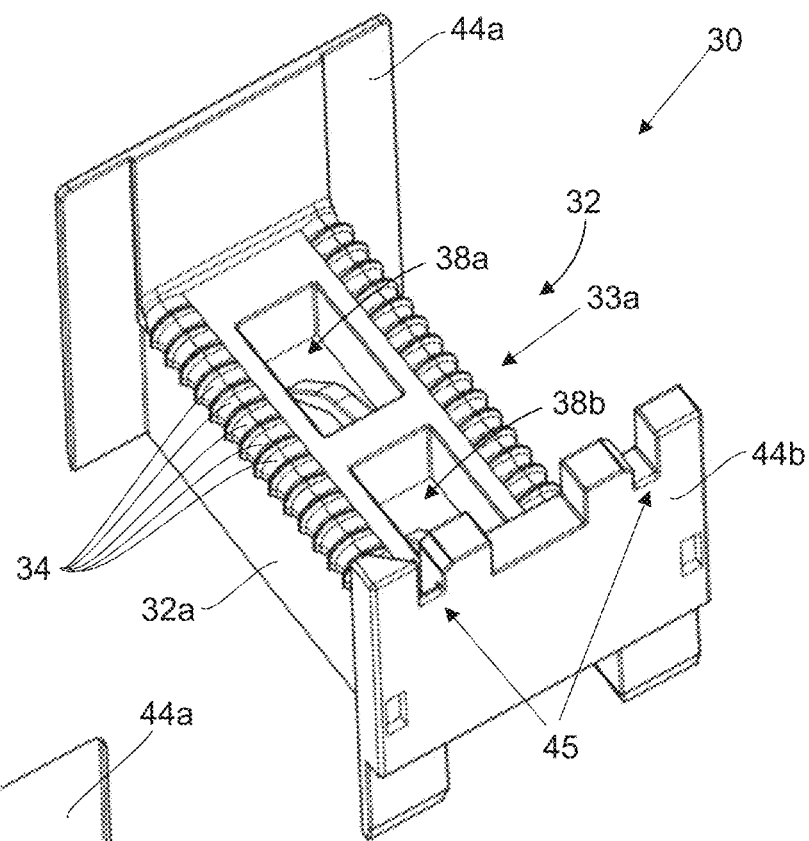
FIG. 1 is a perspective top view of an elastic-locking winding carrier according to an example embodiment of the present invention.

As illustrated in FIG. 1, an elastic-locking winding carrier 30 includes a winding portion 32 adapted to receive a winding having a wound electrical conductor to produce a coil, and a first sidepiece 44a and a second sidepiece 44b arranged on two opposite sides of the winding portion 32. One sidepiece 44b of the winding carrier 30 includes two cut-out portions 45. One of these cut-out portions 45 is adapted to receive the leading end of the electrical conductor while the other is adapted to receive the trailing end of the electrical conductor for electrical interconnection of the coils in the stator.

The winding portion 32 includes an upper portion 33a and a lower portion 33b (ss, e.g., FIG. 2) and also a first through-opening 38a and a second through-opening 38b extending from the upper portion 33a to the lower portion 33b of the winding portion 32. Bore openings may, however, be located on the lower portion of the winding portion. The first and second through-openings 38a, 38b may have, for example, a constant square or rectangular cross-section along an axis perpendicular to a plane coinciding with the upper portion 33a of the winding portion 32.

Figure 3:
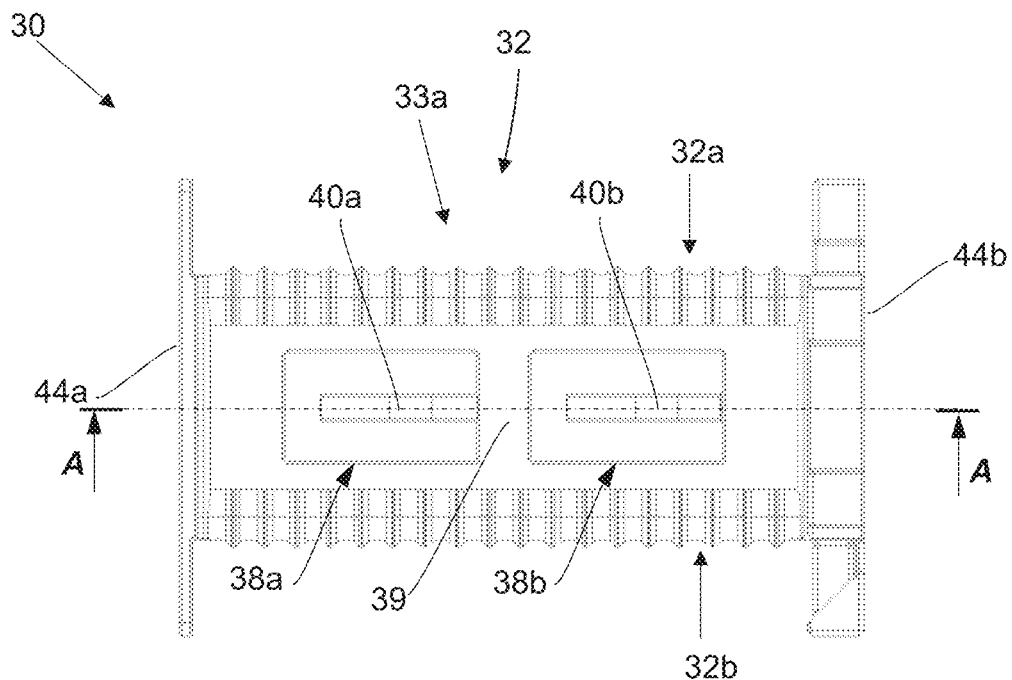
FIG. 3 is a top view of the elastic-locking winding carrier illustrated in FIG. 1.

As illustrated in FIG. 3, the first and second openings 38a, 38b are spaced apart from each other to form a bridge 39 therebetween to ensure structural rigidity to the winding carrier 30, thus minimizing the risk of the winding carrier 30 collapsing during and after the winding process.

Figure 2:
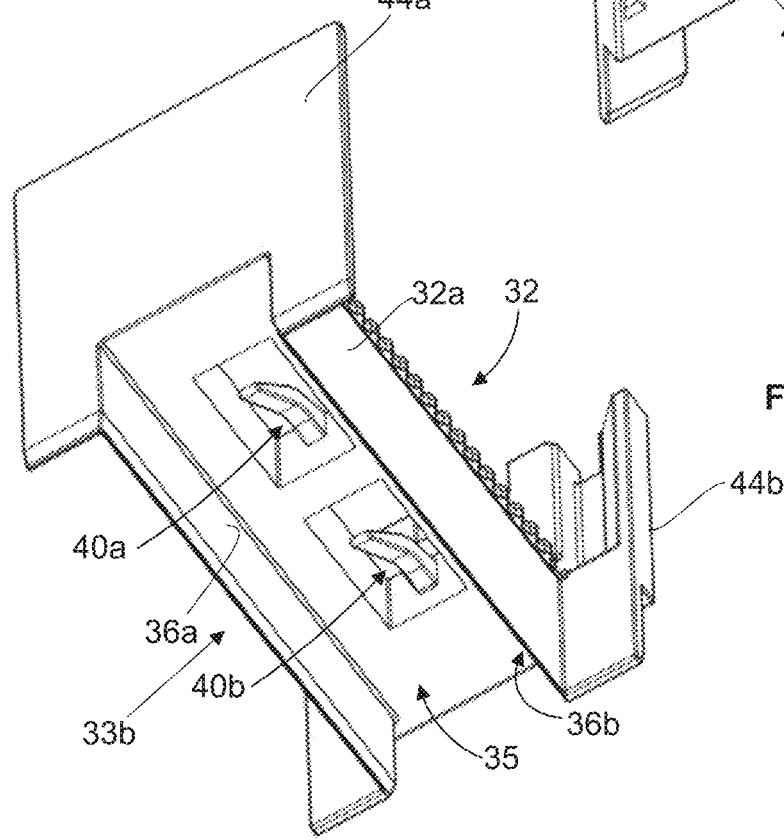
FIG. 2 is a perspective bottom view of the elastic-locking winding carrier illustrated in FIG. 1.

As illustrated in FIGS. 2 and 3, a first flexible member 40a and a second flexible member 40b are arranged to project from a lateral side of respective first and second through-openings 38a, 38b and to extend thereacross. The first and second flexible members 40a, 40b each include an arcuate portion that extends downwardly.

As illustrated in FIG. 3, the first and second flexible members 40a, 40b are aligned within a plane equidistant from two opposite sides 32a, 32b of the winding portion 32 and orthogonal to a plane coinciding with the upper portion 33a of the winding portion 32.

Figure 4:
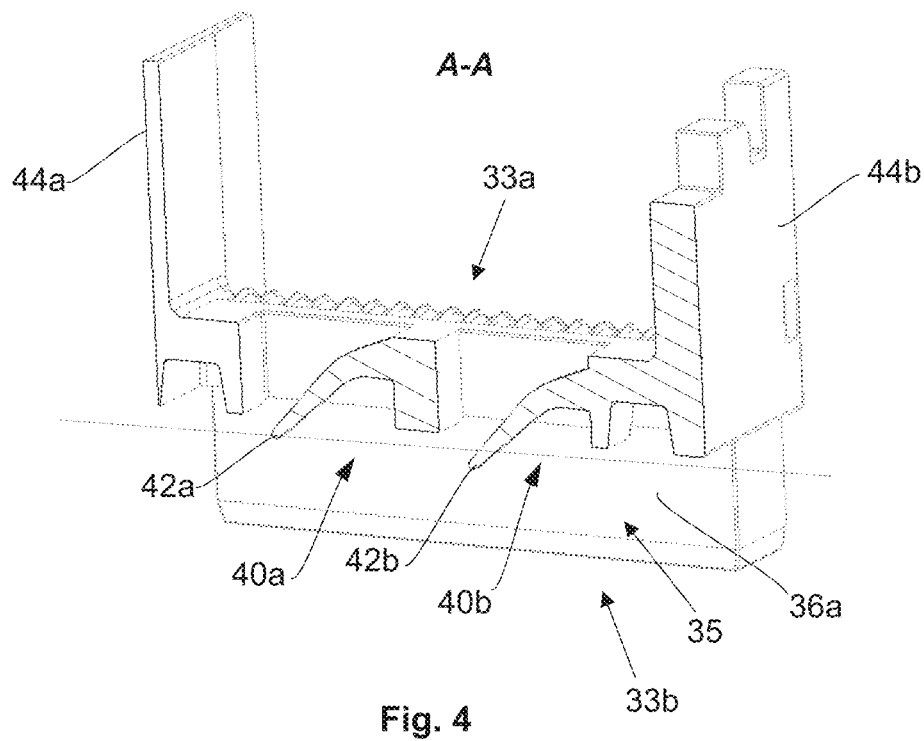
FIG. 4 is a cross-sectional view of the elastic-locking winding carrier taken along the line A-A of FIG. 3.
Figure 8:
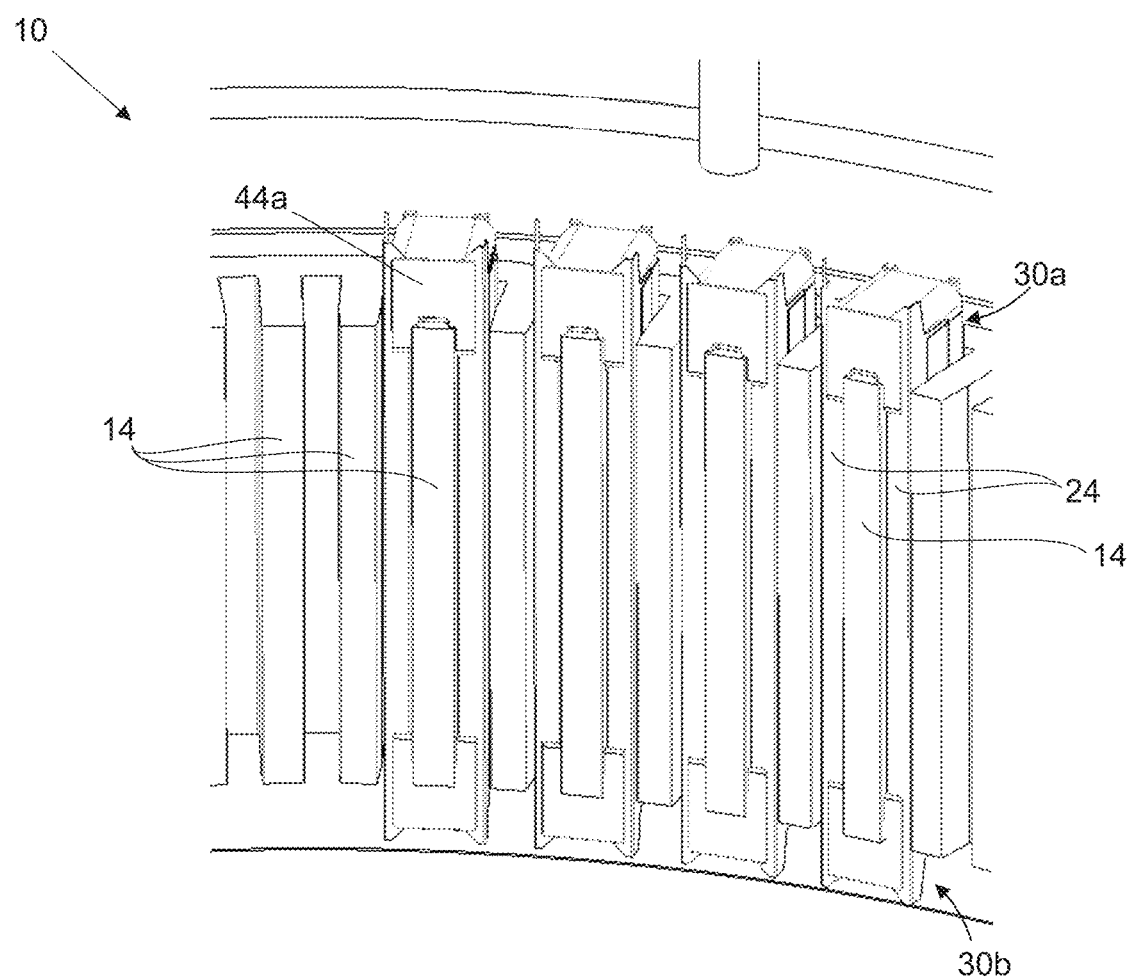
FIG. 8 is a partial perspective view of a stator of a rotary electric motor, in which preformed coil assemblies are mounted on the rotor teeth.

As illustrated in FIGS. 2 and 4, the distal ends 42a, 42b of both first and second flexible members 40a, 40b are located in a tooth receiving portion 35 adapted to be adjusted on an upper or lower portion of a tooth 14 of a stator 10 as illustrated in FIG. 8. The tooth receiving portion 35 is in the form of a rectangular-shaped cavity including two opposite lateral walls 36a, 36b arranged to come in contact with the upper or lower lateral sides of a tooth of the stator.

As illustrated in FIG. 4, the distal end 42b of the flexible member 40b extends into the rectangular-shaped cavity 35 further below the distal end 42a of flexible member 40a, for example, by of few tenth of a millimeter. The first and second flexible members 40a, 40b are therefore arranged such that either of the first and second flexible members 40a, 40b cooperates with a tooth 14 of the stator 10 as a function of the magnitude of the gap between an upper or a lower side of the tooth 14 and the lower portion 33b of the winding portion 32 when the elastic-locking winding carrier 30 is mounted on the tooth.

Figure 5:
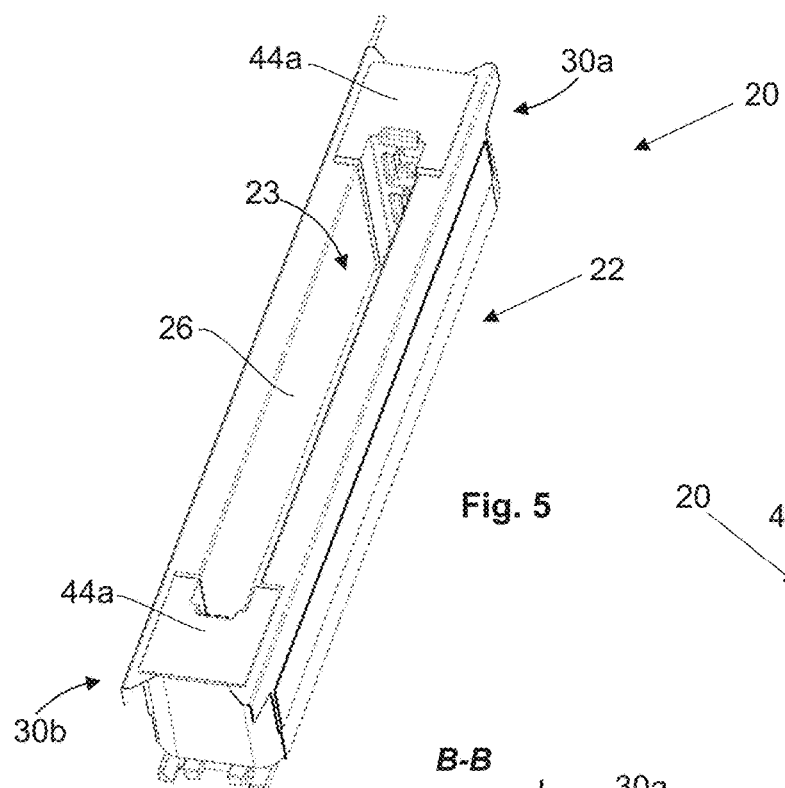
FIG. 5 is a perspective view of a preformed coil assembly according to an example embodiment of the present invention.

FIG. 5 illustrates a preformed coil assembly 20 including a first elastic-locking winding carrier 30a and a second elastic-locking winding carrier 30b. The preformed coil assembly 20 is formed by a winding process that includes placing the first and second elastic-locking winding carriers 30a, 30b on both ends of a rectangular metallic support and insulating paper 26 on both side walls of the metallic support. The wire turns are then wound in layers by a winding machine onto the first and second winding carriers 30a, 30b and insulating paper.

The wire turns may be wound, for example, by placing the next layer shifted by half the wire diameter to lay the wires in a hexagonal mesh. Upper lateral edges of both winding carriers include closely adjacent grooves 34 for guiding the winding direction of the electrical conductor forming the winding during the winding process. The wire turns may, however, be wound around two winding carriers, in which one winding carrier is a regular winding carrier and the other winding carrier is the elastic-locking winding carrier as described above.

Figure 6:
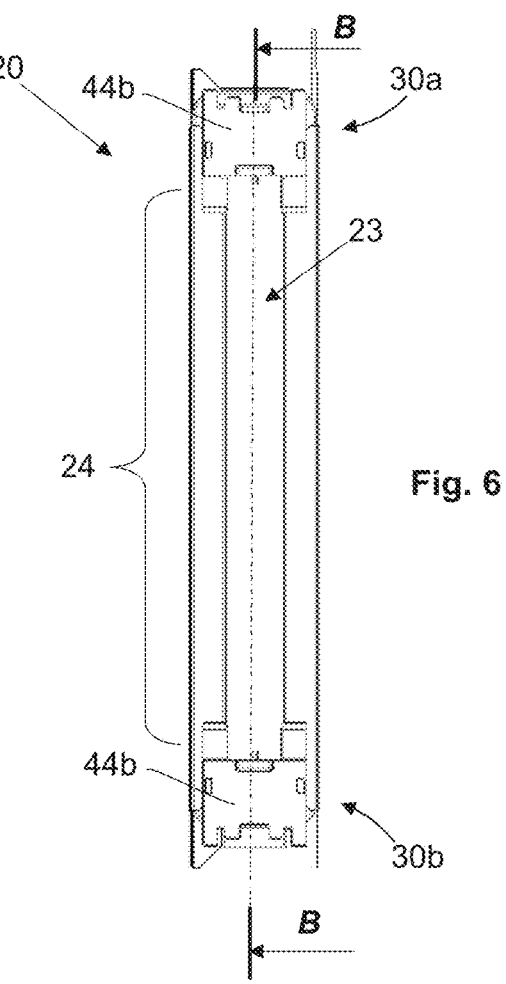
FIG. 6 is an elevation view of the preformed coil assembly illustrated in FIG. 5.

Then, the entire coil is heated up to polymerize the glue with which the wires are coated in order to obtain the preformed coil assembly 20 illustrated FIG. 5, in which insulating paper 26 covers the lateral sides of the elongated opening 23. The preformed coil assembly 20 therefore includes a preformed coil 22 having winding sections 24 on both sides of the elongated opening 23 (see, e.g., FIG. 6).

Figure 7:
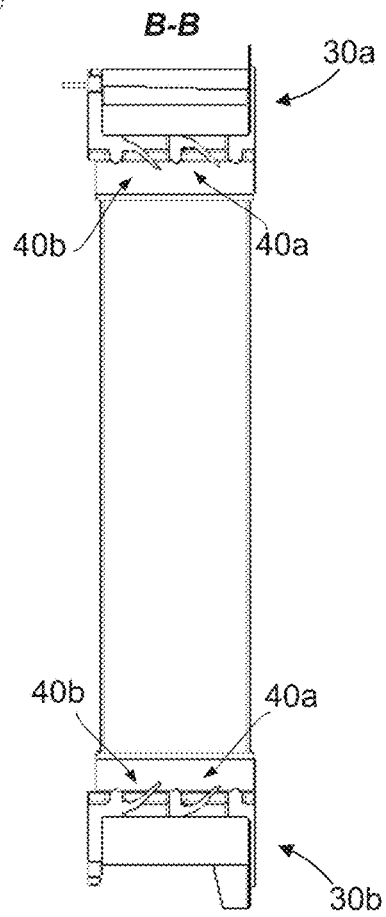
FIG. 7 is a cross-sectional view of the preformed coil assembly taken along the line B-B of FIG. 6.

Preformed coil assemblies 20 are then pushed radially on corresponding teeth 14 of the stator 10 as illustrated in FIG. 8. One of the first and second flexible members 40a, 40b of the first and second elastic-locking winding carriers 30a, 30b illustrated in FIG. 7 elastically cooperates with respective upper and lower sides of the tooth. If the gap is large, the distal end 42b of the flexible member 40b of respective winding carrier 30a, 30b is able to produce enough force to guarantee self-alignment of the preformed coil assembly with the corresponding tooth. However, if the gap is small, the flexible member 40b is configured to break loose when the preformed coil assembly 20 is mounted on the tooth 14 while the distal end 42a of the other flexible member 42a is able to produce enough force to guarantee self-alignment of the preformed coil assembly with the corresponding tooth.

After self-alignment of all preformed coil assemblies 20 with the corresponding teeth 14 of the stator 10 and once all the electric connections are completed, a potting operation is performed, which includes placing the stator in a potting mold into which a synthetic resin is injected that hardens, permanently protecting the assembly, for example, against shock, vibration, water infiltration, moisture, etc. The above-described elastic-locking winding carrier therefore ensures that the preformed coil assemblies are well aligned with respect to the stator before being permanently fixed in their respective position by the potting operation.

LIST OF REFERENCE NUMERALS

10 Stator
14 Tooth
20 Preformed coil assembly
22 Preformed coil
23 Elongated opening
24 Winding section
26 Insulating layer
30 Elastic locking winding carrier
32 Winding portion
32a, 32b Opposite sides
33a Upper portion
34 Adjacent grooves
33b Lower portion
35 Tooth receiving portion
36a, 36b Lateral walls
38a, 38b First and second openings
39 Bridge
40a, 40b First and second flexible members
42a, 42b Distal ends
44a, 44b First and second sidepieces
45 Cut-out portions

What is claimed is:

1. An elastic-locking winding carrier for a preformed coil assembly of a stator of an electric motor, comprising:
a winding portion adapted to receive a winding including a wound electrical conductor to produce a coil, the winding portion including an upper portion and a lower portion, a first opening being arranged on the winding portion, a second opening being arranged on the winding portion, a first flexible member being arranged inside the first opening, and a second flexible member being arranged inside the second opening;
wherein the first and second flexible members are arranged so that at least one of the first and second flexible members cooperates with a tooth of the stator as a function of a magnitude of a gap between the tooth and the lower portion of the winding portion when the preformed coil assembly is mounted on the tooth to fix the preformed coil assembly to the tooth.

2. The elastic-locking winding carrier according to claim 1, wherein one of the first and second flexible members is configured to break loose when the preformed coil assembly is mounted on the tooth.

3. The elastic-locking winding carrier according to claim 1, wherein the first flexible member is connected to a lateral side of the first opening and extends across the first opening, and the second flexible member is connected to a lateral side of the second opening and extends across the second opening.

4. The elastic-locking winding carrier according to claim 1, wherein the first and second flexible members are aligned within a plane equidistant from two opposite sides of the winding portion.

5. The elastic-locking winding carrier according to claim 1, wherein the first and second openings are arranged as through-openings extending from the upper portion to the lower portion of the winding portion.

6. The elastic-locking winding carrier according to claim 1, wherein the first and second openings have a constant square or rectangular cross-section along an axis perpendicular to a plane coinciding with the upper portion of the winding portion.

7. The elastic-locking winding carrier according to claim 1, wherein the first and second flexible members have unequal lengths.

8. The elastic-locking winding carrier according to claim 1, wherein the first flexible member extends from the first opening a greater distance than the second flexible member extends from the second opening.

9. The elastic-locking winding carrier according to claim 1, wherein at least one of the first and second flexible members includes an arcuate portion.

10. The elastic-locking winding carrier according to claim 1, wherein a distal end of each of the first and second flexible members extends below the lower portion of the winding portion into a tooth receiving portion, the distal end of a first one of the first and second flexible members extending further below the distal end of a second one of the first and second flexible members.

11. The elastic-locking winding carrier according to claim 10, wherein the tooth receiving portion is arranged as a right rectangular prism-shaped portion configured to be adjusted against an upper portion or a lower portion of the tooth.

12. The elastic-locking winding carrier according to claim 1, wherein the first and second openings are spaced apart from each other by a bridge therebetween.

13. The elastic-locking winding carrier according to claim 12, wherein the bridge is adapted to provide structural rigidity to the winding carrier.

14. A preformed coil assembly, comprising:
a preformed coil having an elongated opening and two winding carriers arranged at respective ends of the elongated opening of the preformed coil;
wherein at least one of the winding carriers is arranged as an elastic-locking winding carrier including a winding portion adapted to receive a winding including a wound electrical conductor to produce the coil, the winding portion including an upper portion and a lower portion, a first opening being arranged on the winding portion, a second opening being arranged on the winding portion, a first flexible member being arranged inside the first opening, and a second flexible member being arranged inside the second opening; and
wherein the first and second flexible members are arranged so that at least one of the first and second flexible members cooperates with a tooth of the stator as a function of a magnitude of a gap between the tooth and the lower portion of the winding portion when the preformed coil assembly is mounted on the tooth to fix the preformed coil assembly to the tooth.

15. The preformed coil assembly according to claim 14, wherein both winding carriers are arranged as the elastic-locking winding carrier including the winding portion adapted to receive the winding including the wound electrical conductor to produce the coil, the winding portion of each elastic-locking winding carrier including the upper portion, the lower portion, the first opening, the second opening, the first flexible member, and the second flexible member.

16. A rotary electric motor, comprising:
a stator including:
radial teeth; and
a preformed coil assembly mounted on each tooth and including a preformed coil having an elongated opening and two winding carriers arranged at respective ends of the elongated opening of the preformed coil;

wherein at least one of the winding carriers is arranged as an elastic-locking winding carrier including a winding portion adapted to receive a winding including a wound electrical conductor to produce the coil, the winding portion including an upper portion and a lower portion, a first opening being arranged on the winding portion, a second opening being arranged on the winding portion, a first flexible member being arranged inside the first opening, and a second flexible member being arranged inside the second opening; and wherein the first and second flexible members are arranged so that at least one of the first and second flexible members cooperates with a respective tooth of the stator as a function of a magnitude of a gap between the tooth and the lower portion of the winding portion when the preformed coil assembly is mounted on the tooth to fix the preformed coil assembly to the tooth.

17. The rotary electric motor according to claim 16, wherein a potting compound encapsulates the teeth and the preformed coil assemblies.

\* \* \* \* \*